Oct. 5, 1937.     F. B. CARD     2,094,735
MEANS FOR RECORDING OR INDICATING ELECTRICAL IMPULSES
Filed Dec. 28, 1933
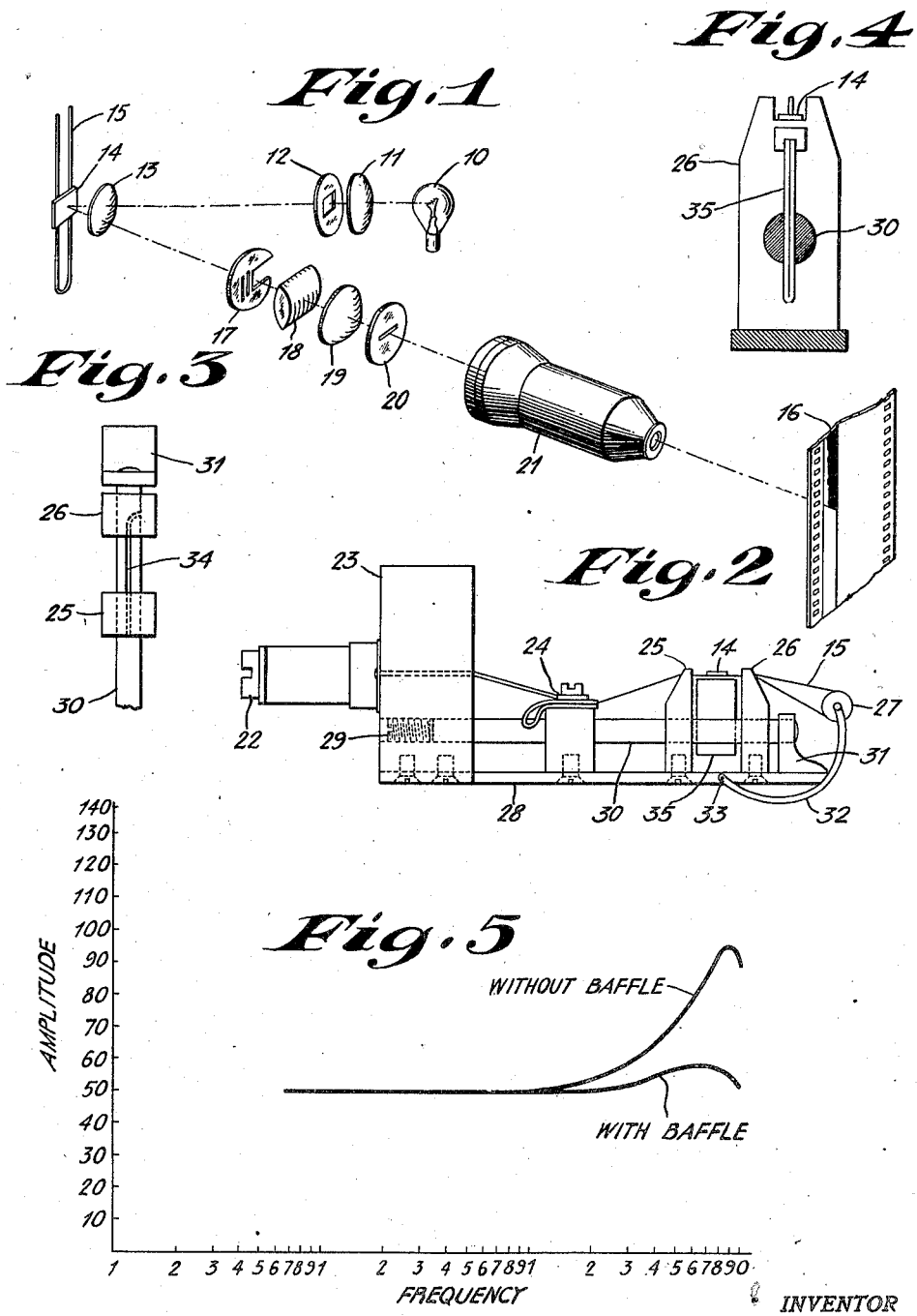
INVENTOR
FOSTER B. CARD
BY
ATTORNEY Patented Oct. 5, 1937

2,094,735

UNITED STATES PATENT OFFICE 2,094,735

MEANS FOR RECORDING OR INDICATING ELECTRICAL IMPULSES

Foster B. Card, Los Angeles, Calif., assignor to Radio-Keith-Orpheum Corp., a corporation of Maryland Application December 28, 1933, Serial No. 704,263

4 Claims. (Cl. 171—95)

This invention relates to the recording or indicating of electrical impulses, and has for its principal object the provision of an improved apparatus and method of operation whereby the amplitude effect of such impulses at resonance frequencies may be limited or controlled to have any desired value.

A mechanical system including movable parts and subjected to a range of operating frequencies tends to respond unequally to impulses of different frequencies due to the fact that it possesses a natural or free vibration frequency. Thus an indicating or recording instrument such as a galvanometer has a free vibration period or resonance frequency which causes it to respond more strongly to certain frequencies than others. This results in a non-linear response of the device to actuating impulses of different frequencies.

In order to correct this inherent defect, it has been customary to immerse the moving element in a damping fluid or liquid of a consistency calculated to minimize the response of the device within the range of resonance frequencies. Thus where the movable element is immersed in oil, it is customary to choose an oil of such viscosity as to minimize the resonance effect and produce a linear relation between the frequency and the response. This method, however, has the disadvantage that the oil must be changed and can not always be relied upon to produce the exact degree of compensation to produce the desired result.

In accordance with this invention, this difficulty is avoided by the provision of a mechanical element, such as an adjustable baffle, for controlling the movement of the fluid or liquid wherein the movable member or members of the device is mounted. The damping effect may of course be produced by any suitable fluid or liquid such as oil, air or the like.

The invention will be better understood from the following description when considered in connection with the accompanying drawing and its scope will be pointed out in the appended claims.

Referring to the drawing:

Fig. 1 illustrates an impulse recorder in which the improved device is utilized, Fig. 2 is a side view of the device, Figs. 3 and 4 illustrate constructional details of the device, and Fig. 5 is an explanatory diagram relating to the operation of the device.

The apparatus of Fig. 1 is readily recognized as a device for photographically recording sound on the edge of a motion picture film or the like. It includes a light source 10 from which light is projected through a lens 11, a light stop 12 and a lens 13 to a mirror 14 mounted on a looped vibratable electrical conductor 15. Both the mirror 14 and the conductor 15 are mounted in a suitable damping fluid such as oil, air or the like. From the mirror 14, light is reflected to a photographic recording surface through the lens 13, past the edge of a gage 17 and through the lenses 18 and 19, the light slit 20 and the objective 21. It will be readily understood that the conductor 15 is subjected to any appropriate magnetic field, that the mirror 14 vibrates transversely of the direction in which the record 16 is moved and that the exposed area of the record is proportional to the amplitude of the electrical impulses applied to the conductor 15.

As appears more clearly in Fig. 2, the impulses to be recorded are applied to the conductor 15 through terminals 22 and this conductor extends through a member 23, a clamp 24 and over supports 25 and 26 to a pulley 27 which forms a loop midway between the ends of the conductor. These various parts are so constructed and arranged as to ensure that the conductor is properly insulated, and are mounted on a base 28.

For the purpose of regulating the tension of the conductor 15, a screw 29 is threaded into the member 23 and arranged to contact with the left hand end of a tension rod 30 extending through the members 24, 25 and 26 and provided at its right hand end with a member 31 arranged to contact with a pulley support 32 pivoted on or otherwise suitably attached to the base 28 at the point 33.

As indicated in Figs. 3 and 4, the tension rod 30 is slotted at 34 to receive a baffle 35 which may be adjusted with respect to the mirror 14 and the conductor 15 on which it is mounted.

The effect of this baffle is shown by the curves of Fig. 5. Thus without the baffle and with a relatively heavy damping oil, the amplitude of the response in the resonant frequency range is substantially double that in the non-resonant frequency range. With the baffle, this non-linear effect is greatly minimized. It will be apparent that any desired peak amplitude between the limits indicated by the two curves of Fig. 5 may be produced by adjustment of the baffle 35. The smaller the spacing between the baffle edges and the surrounding surfaces of the mirror 14 and the Bakelite surfaces of the members 25 and 26, the greater is the baffling effect. A suitable form of baffle is a folded strip of .005 inch phosphor bronze sheet. It will be apparent that adjustment of the position of the baffle may be effected either directly or by means of a suitable adjusting member mounted outside the casing of the apparatus. The use of a lighter damping fluid of course makes possible a greater range of amplitude adjustment at a higher frequency for the same sensitivity.

Having thus described my invention, I claim:

1. The combination of means vibratable in response to electrical impulses, a fluid medium surrounding said means, and a baffle member having an edge extending adjacent to said means arranged to control the effect of said fluid on the vibrational amplitude of said means at a predetermined range of frequencies.

2. The combination of means vibratable in response to electrical impulses, a fluid medium surrounding said means, and an adjustable baffle arranged to control the effect of said fluid on the vibrational amplitude of said means at a predetermined range of frequencies.

3. The combination of light reflecting means vibratable in response to electrical impulses, a body of oil surrounding said means, and a member immersed in said body having an edge extending adjacent to said means and coacting therewith to vary the vibrational amplitude of said means at a predetermined range of frequencies.

4. The combinations of means for producing a vibratory light beam, a damping medium surrounding said means, and means adjustable in said medium to vary the damping effect of said medium on the vibrational amplitude of said beam throughout only a part of its vibrational frequency range.

FOSTER B. CARD.